Figure 1:
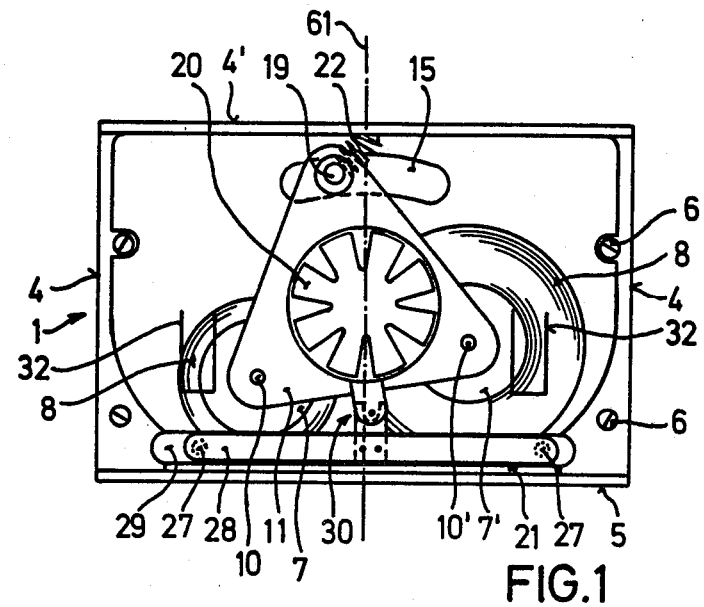

United States Patent [19]

Schoettle et al.

[11] 4,385,331

[45] May 24, 1983

[54] TAPE CARTRIDGE ASSEMBLY AND TAPE TRANSPORT APPARATUS FOR USE THEREWITH

[75] Inventors: Klaus Schoettle, Heidelberg; Rolf Maerthesheimer, Worms; Lothar Gliniorz, Frankenthal; Joachim Flohr, Viernheim, all of Fed. Rep. of Germany

[73] Assignee: BASF Aktiengesellschaft, Ludwigshafen, Fed. Rep. of Germany

[21] Appl. No.: 176,028

[22] Filed: Aug. 7, 1980

[30] Foreign Application Priority Data

Sep. 15, 1979 [DE] Fed. Rep. of Germany ....... 2937396

[51] Int. Cl.³ .................. G11B 15/00; G11B 15/32; G03B 1/04
[52] U.S. Cl. .................. 360/96.1; 360/96.2; 242/199; 242/192
[58] Field of Search .......... 360/96.2, 96.1, 96.5; 242/199, 200, 192

[56] References Cited

U.S. PATENT DOCUMENTS

| | | |
|---|---|---|
| 3,520,495 | 7/1970 | Sotani . |
| 3,526,371 | 9/1970 | Blackie ........................ 242/200 |
| 3,528,625 | 9/1970 | Bumb . |
| 3,528,626 | 9/1970 | Bumb . |
| 3,602,458 | 8/1971 | Doby ........................... 242/199 |
| 3,603,595 | 9/1971 | Kaisha ......................... 360/96.2 |
| 3,930,268 | 12/1975 | Uemura ....................... 360/96.2 |

FOREIGN PATENT DOCUMENTS

| | | |
|---|---|---|
| 1001013 | 2/1957 | Fed. Rep. of Germany . |
| 1010285 | 6/1957 | Fed. Rep. of Germany . |
| 1138561 | 5/1963 | Fed. Rep. of Germany . |
| 1196879 | 7/1965 | Fed. Rep. of Germany . |
| 1956807 | 7/1970 | Fed. Rep. of Germany . |
| 1574439 | 6/1971 | Fed. Rep. of Germany . |
| 780546 | 8/1957 | United Kingdom . |

*Primary Examiner*—Robert M. Kilgore
*Attorney, Agent, or Firm*—Keil & Witherspoon

[57] ABSTRACT

A magnetic tape cartridge and tape transport apparatus for use therewith, comprising a cartridge housing and a support which is movable inside the housing in all directions in the plane of the latter and on which hubs are rotatably mounted, between which hubs a magnetic tape can be wound to and fro, and further comprising spring elements which urge the support toward the front wall of the housing, which wall is provided with openings, the tape transport apparatus having means for receiving the cartridge housing, for which guide elements and actuatable locking means are provided, and a magnetic head and capstans which can pass through the openings in the front wall, the capstans being urged, by spring pressure, into contact with the rolls of magnetic tape.

17 Claims, 7 Drawing Figures

TAPE CARTRIDGE ASSEMBLY AND TAPE TRANSPORT APPARATUS FOR USE THEREWITH

This invention relates to a tape cartridge assembly, containing two rolls of tape, for use with a tape transport apparatus in which two tape-driving capstans engage the peripheral surfaces of the rolls of tape.

In a known tape cartridge of this type, as described in German Published Application DAS No. 1,956,807, the two hubs are rotatably mounted in a common support consisting of two arms which can pivot about a common pin.

To effect pressural engagement of the rolls of tape carried by the hubs with the capstans on the transport apparatus, tension springs are provided which act on the two arms so that the rolls of tape are constantly pulled toward the capstans entering openings in the front wall of the cartridge. The pivot for the two arms is supported by the cartridge housing.

Due to the fact that the pivot for the two arms is stationary within the cartridge housing, the latter must be so dimensioned that between the path of movement of each hub bearing and each side wall of the housing there is sufficient space to accommodate half of a fully wound tape reel. It is therefore not possible to reduce the hitherto customary cartridge size even with this cartridge design. In order to overcome this disadvantage, it has already been proposed, in German Laid-Open Application DOS No. 1,574,439, to provide the bottom and the top of the cartridge housing with arc-shaped longitudinal guide slots which are engaged by the spindles, carried by a common pair of supports, of the hubs, so that the pair of supports can be displaced along the guide slots. With such a cartridge design, however, the mobility of the rolls of tape toward and away from the functional openings in the front wall is lost. For this reason the compressive forces between the periphery of the tape roll and the capatan, required for tape transportation, must be produced on the tape transport. The cartridge can therefore be used only in tape transports having this design feature. In addition, with this known tape cartridge it is impossible to reverse the direction of tape transportation since only one of the two rolls of tape can be driven.

It is an object of the present invention to provide a magnetic tape cartridge and a tape transport apparatus for use therewith, by means of which the demand both for small space requirements of the cartridge and for the greatest possible mobility of the support for the rolls of tape is met, the magnetic tape being transportable in either direction.

This object is achieved by a tape cartridge assembly for use with a tape transport apparatus, comprising:

a right parallelepipedal cartridge housing having a bottom, a top and side walls, one of which is provided with at least one opening and serves as the front wall, two hubs which are rotatably mounted, inside the housing, on a movable support and which carry rolls of tape which can be wound bidirectionally from one hub to the other, on the transport apparatus, at least one magnetic head which can pass through the opening in the front wall to engage the magnetic tape running inside the cartridge parallel to the front wall, on the transport apparatus, two capstans which can be driven by at least one motor and which can be brought into contact with the peripheries of the two rolls of tape through the opening in the front wall, and at least one spring element for producing pressural contact, wherein the support for the hubs can be displaced parallel to the top and bottom of the cartridge housing, the spring element bearing against the cartridge housing urges the support toward the front wall, and on the transport apparatus, a cartridge holder having conventional guide elements is provided which has actuatable locking devices which engage the cartridge housing and by means of which the cartridge can be locked in position relative to the capstans.

In summary, it should be noted that the cartridge according to the invention in all its embodiments is small in size and offers extensive mobility of the rolls of tape with the functional means associated therewith. As a result, the cartridge is flexible in operation and thus has the advantage of universal applicability in tape transports employing capstans in contact with supply and takeup rolls of tape.

Figure 2:
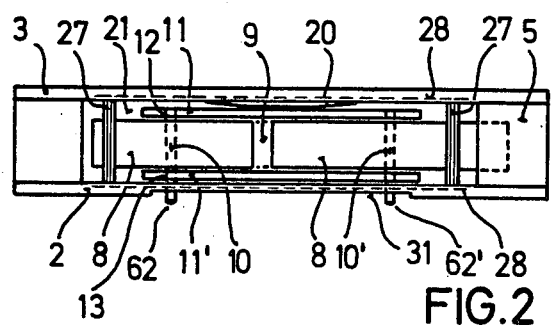
Figure 4:
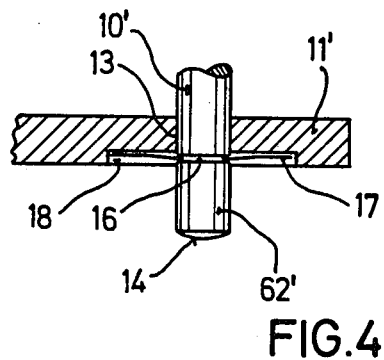
Figure 3:
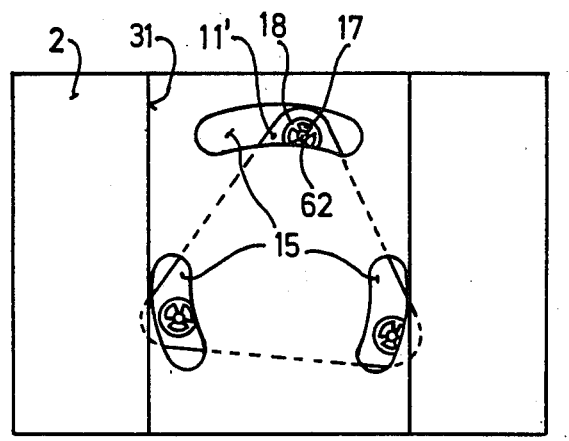
Figure 5:
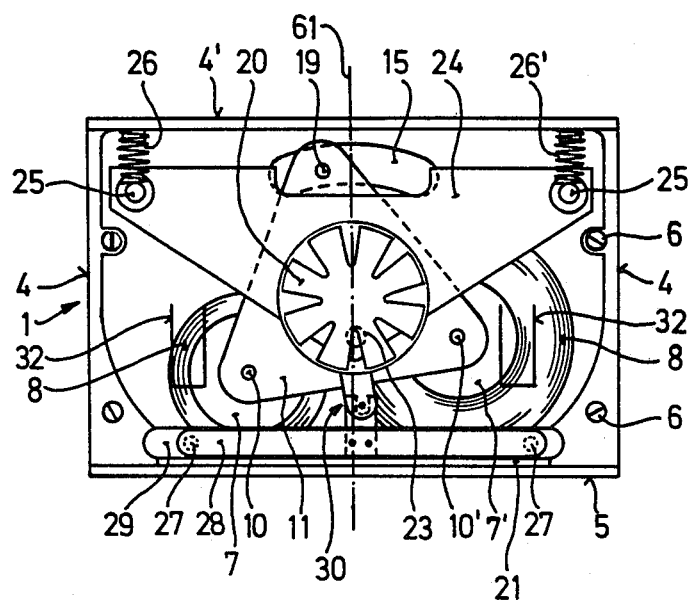
Figure 6:
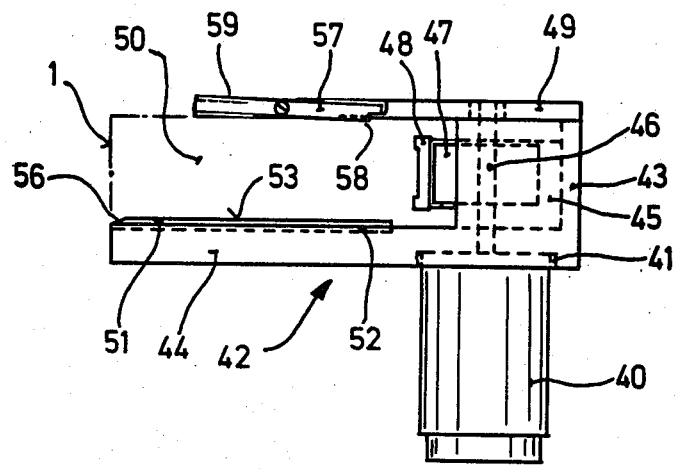
Figure 7:
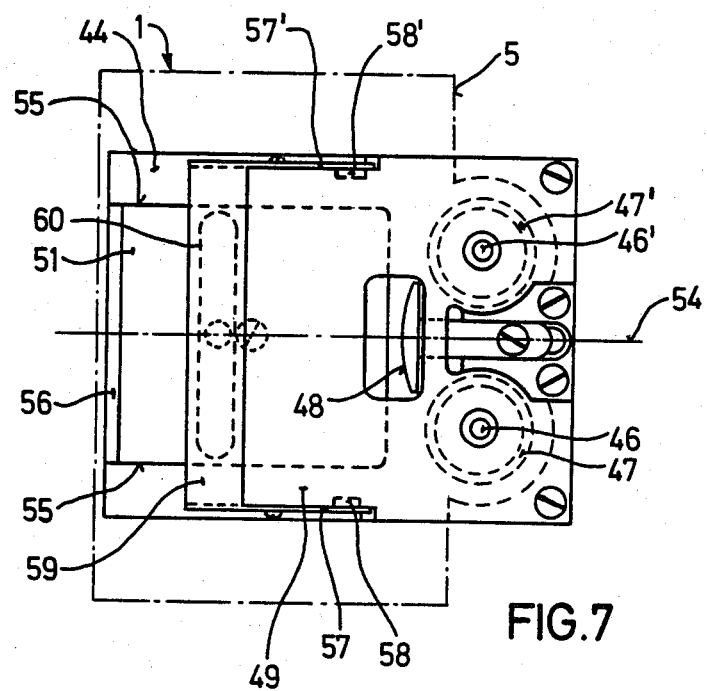

Further advantages and details of the novel magnetic tape cartridge and tape transport apparatus for use therewith are disclosed in the following description of the embodiments shown in the accompanying drawings, in which:

FIG. 1 is a schematic plan view of the tape cartridge of the invention (with a transparent top), FIG. 2 is a schematic front view of the tape cartridge, FIG. 3 shows the cartridge bottom, FIG. 4 shows a section of the mounting for one of the two support members for the hubs, FIG. 5 shows a further embodiment of the tape cartridge (with a transparent top), FIG. 6 is a schematic side view of the tape transport apparatus according to the invention, and FIG. 7 is a schematic plan view of the tape transport apparatus of FIG. 6.

Referring to FIGS. 1 and 2, the substantially right parallelepipedal cartridge housing 1 has a bottom 2, a top 3, two side walls 4, a rear wall 4' and a front wall 5. It preferably consists of two halves joined together by screws 6 or rivets and manufactured from a plastics material by injection molding.

In the cartridge housing, two rolls 8 of tape, carried by hubs 7 and 7' respectively, are arranged next to one another, between which rolls a magnetic tape 9 can be wound to and fro and the size of which substantially determines the dimensions of the cartridge housing 1. As will be seen later, owing to the fact that the rolls of tape are displaceable, the longitudinal extent of the cartridge need only be somewhat greater than that of two rolls of tape of equal size which is set up during winding. The transverse extent of the cartridge housing 1 is determined essentially by the maximum roll diameter, whereas its height is determined by the width of the magnetic tape 9 and the thickness of the holding means above and below it.

The two hubs 7, 7' are mounted to be freely rotatable about axles 10, 10' located in a common support. The support consists of a pair of triangular members 11, 11' which can be moved in all directions inside the housing parallel to the bottom 2 and top 3. The upper ends of axles 10, 10' are fastened in holes 12 in the member 11 adjacent to the top 3, and the lower ends are fixed in holes 13 in the member 11' adjacent to the bottom 2.

In an advantageous embodiment, the axles are provided with extensions 62, 62' which pass snugly through holes 13 and contact, with their dome-shaped ends 14, the bottom of the cartridge for the purpose of locating the rolls 8 of tape at the correct level inside the cartridge. However, in view of the fact that the magnetic tape cartridges and tape transport apparatuses should be compatible, it is more advantageous to provide this contact surface, acting as reference surface 53, for the ends 14 on the tape transport apparatus and to provide the bottom 2 of the cartridge with slots 15 (FIG. 3) through which the extensions 62, 62' can pass.

This also ensures that the member 11', which is supported by retaining rings 17 engaging annular grooves 16 (FIG. 4) in the extensions 62, 62', does not make contact with the bottom 2 during operation of the cartridge on the transport apparatus. The size and shape of the slots 15 must be matched to the manner of movement of the pair of triangular members 11, 11' inside the cartridge housing 1. Recesses 18 are provided, for the retaining rings 17, in member 11' so that these rings do not project beyond its lower surface.

The distance between the two axles 10, 10' must be such that there is sufficient space available for tape rolls of equal size. In order to obtain a sturdy support and to maintain its position with respect to the reference surface 53 on the apparatus, it is advantageous to provide a third shaft 19 at the same distance from the two axles 10, 10', so that an equilateral triangle is formed.

The members 11, 11' are of course not restricted to the triangular shape; they may for example be rectangular, arcshaped, circular or elliptical.

So that a force can be exerted by the axles 10, 10', via the extensions 62, 62', on the reference surface on the apparatus, or by the member 11' on the bottom 2 of the cartridge housing when the cartridge has been removed from the apparatus, this force being required for stabilizing the position of the support, a cup spring 20 is inserted between the member 11 and the top 3. The edge of this spring rests in a recess, matching it in diameter, in the top 3, and its lower dome-shaped portion contacts member 11.

Between the bottom 2 and top 3, respectively, of the cartridge housing 1 and the members 11 and 11' supporting the rolls 8 of magnetic tape, there is exclusively sliding contact, as can be seen from the above description. In this manner a type of "floating bearing" is obtained for the support in the cartridge housing, thus ensuring the greatest possible mobility of the rolls of magnetic tape.

In order to maintain pressural contact between the rolls 8 of magnetic tape and the capstans of a tape transport which cooperate with the peripheral surfaces of the rolls and which, together with the magnetic head on the tape transport apparatus, enter openings 21 in the front wall 5 of the cartridge housing 1 or through the completely open front wall, during insertion of the cartridge into the cartridge holder 50 of the apparatus, to engage the rolls 8 of tape and the magnetic tape 9 respectively, the members 11, 11' are spring-loaded against the rear wall 4' by means of a helical spring 22. In order to fasten the ends of the spring to the support and to this wall, conventional positive or non-positive connecting means such as screws or recesses can be used.

To improve guidance of the members 11, 11' inside the cartridge housing 1, particularly with regard to the fact that the support is spring-loaded against the rear wall 4', in the embodiment shown in FIG. 5 the pair of members 11, 11' of the support are mounted in a frame for pivotal movement about a pivot 23 in the approximate center of the plates. In this preferred embodiment, the frame likewise consists of two triangular plates 24, 24' which embrace the central portion of the pair of members 11, 11' of the support. The bases of the triangular plates 24, 24', which extend along the rear wall 4', can be of the length required by the desired freedom of movement of the support members 11, 11' in this direction. At the corners of the base, the two plates 24, 24' are held together by spacer pins 25 which are riveted or screwed to the plates. The third point of attachment is formed by the pivot 23.

In this embodiment, the members 11, 11' are resiliently supported by helical springs 26 and 26', instead of spring 22, which are attached at one end to the spacer pins 25 and, at the other, cooperate with recesses in the rear wall 4'. The springs can be connected to the spacer pins, for example, by hooking the ends of the springs into radial holes in the spacer pins or by means of radial recesses in the spacer pins, in which the springs are held.

To produce a sliding connection between the support for the hubs 7, 7' and the cartridge housing 1, the plates 24, 24' of the frame assume the role played by the members 11, 11'.

In order to prevent rotation of the rolls 8 of magnetic tape when the cartridge is removed from the tape transport apparatus, brake elements are provided which consist of pins 27 that are arranged parallel to the hub axles 10, 10' and symmetrically with respect to the transverse center axis 61, and are fastened in the bottom 2 and top 3 near the open front wall 5 in the corner areas of the cartridge housing.

In order to conform the movement of the pins 27 to that of the rolls 8 of tape, it is, however, more advantageous to attach them, preferably by riveting, to bars 28 which can be displaced in grooves 29, running parallel to the front wall 5, in the bottom 2 and top 3.

A hinged connection 30 between the bars 28 and at least one of the two support members 11, 11' makes it possible for the bars and thus the pins 27 to be positively moved in conjunction with the rolls 8 of magnetic tape. This is of advantage insofar as the pins 27, when the cartridge is in the apparatus, are in a constant state of readiness in the correct position for engagement of the rolls of tape after removal of the cartridge from the apparatus.

In order to ensure that the cartridge is introduced into the tape transport apparatus in the correct position for engagement of the functional elements on the apparatus with the magnetic tape 9 and the rolls 8 of magnetic tape, the outer surface of the cartridge bottom 2 is provided with a recess which is arranged symmetrically with respect to the transverse center axis 61, and the longitudinal sides of which run parallel to said axis. This recess 31 is engaged by guide elements of the cartridge holder on the apparatus when the cartridge is inserted into the apparatus.

In addition, the top 3 of the cartridge is provided with depressions 32, which are arranged symmetrically with respect to the transverse center axis 61 and have ramps inclined toward the front wall 5 and which are engaged by locking devices, on the transport apparatus, for locking the cartridge in the cartridge holder.

FIGS. 6 and 7 show the drive mechanism of the tape transport apparatus for use with the magnetic tape cartridge described above. In this, two motors 40 can be seen which are held in cylindrical recesses 41 in an L-shaped support 42. In the short arm 43 of the L-shaped support a housing 45, which is open toward the long arm 44 of the L-shaped support, is formed, the walls of which accommodate the lengthened shafts 46, 46' of the motors. On these shafts the two capstans 47, 47' for driving the rolls 8 of magnetic tape are mounted. In this arrangement, the capstans, comprising an elastomeric covering, for example of plastic or hard rubber, are largely enclosed by the housing 45. Between the two capstans the magnetic head 48, for recording and reproducing signals on the tape, is located which is mounted on the housing nd projects slightly beyond the capstans, like these, into the free space above the long, plate-shaped arm 44 of the support 42.

A plate 49, extending past the long arm 44 and parallel thereto by a distance corresponding to the height of a cartridge, is attached to the short arm 43 of the support 42; its extent is preferably matched to that of the long arm and, together with the latter, it forms the cartridge holder 50. A plate 51, protruding slightly into the cavity of the cartridge holder, is held in a recess 52 in the long arm by means of screw connections or by other suitable positive connecting means, for example dovetail joints. The surface of the plate 51 represents the reference surface 53 for exactly positioning the rolls 8 of tape at the correct level with reference to the magnetic head 48; for this reason the surface is machined to be exactly plane and is arranged at a specific distance from the corresponding reference plane of the magnetic head, gauge tolerances being observed in both instances. In the practical design of the transport apparatus according to the invention, the magnetic head is held, on the housing 45, by means of devices known to the skilled worker, so as to be adjustable with respect to the reference surface 53. As already explained above, the domed ends 14 of the extensions 62, 62' of the axles 10, 10' for the hubs rest on the reference surface 53 of the plate 51 when the cartridge is located in the apparatus.

In addition, the edges 55 of the plate 51, which are arranged symmetrically with respect to, and run parallel to, the longitudinal axis 54 of the long arm 44, serve as guides for the cartridge, the said edges cooperating with the corresponding edges of the recess 31 in the cartridge bottom 2. An inclined surface 56 on the plate 51 facilitates the insertion of the recessed cartridge bottom over the plate. Upon insertion of the cartridge, the capstans 47, 47' and the magnetic head pass through the opening(s) in front wall 5 and come into contact with the rolls 8 of magnetic tape and the magnetic tape 9 respectively.

The springs 22 and 26, 26', provided for producing pressured contact, can become effective only if the cartridge housing 1 is held fast in the cartridge holder 50 by actuatable locking devices. For this purpose, levers 57 and 57' are pivotably mounted on each side of the plate 49 and are provided, at the ends which can be swung down into the cavity for accommodating the cartridge, with projections 58 and 58' and, at their other ends, are joined by a web 59 extending over the plate 49. Between the web and the plate a leaf spring 60 is inserted which can be fastened either to the web or to the plate. This spring constantly urges the ends of the two levers with the projections downwards into the cavity for accommodating the cartridge, so that the projections engage the ramp-like recesses 32 in the cartridge top 3 when the cartridge is inserted into the cartridge holder 50, and are thus able to hold the cartridge fast for operation. To release the locking means for the purpose of removing the cartridge from the transport apparatus, the ends of the levers are swung upwards by pressing the web down against the spring force.

In order to maintain the required tape tension while the magnetic tape is being transported for recording or reproducing purposes, the two motors 40, 40' drive the rolls of tape at different speeds of rotation. As is known, a further possibility resides in braking the supply tape roll. The electric circuit for controlling the different speeds of rotation, the sense of rotation being reversible for bidirectional operation, is not a subject of the present invention and is therefore not described herein in further detail. In addition, such speed control and regulating systems are known from the relevant technical literature, for example: "GrundriB der praktischen Reglungstechnik" (Principles of Practical Control Engineering) by Erwin Samal.

It is furthermore possible to urge each roll of tape with a different force against the capstans, which are provided with a resilient peripheral portion, in order to obtain a peripheral speed which is higher on the take-up side than on the supply side, and thus to maintain the tape tension, due to the different mass flow of the resilient material, at the contact points, resulting from the different degrees of deformation of the peripheral portions.

For the tape transport electronics for processing the signals to be recorded and reproduced, appropriate conventional circuits can be used, so that there is no need to discuss these here in greater detail.

The tape transport according to the invention is of course not restricted to the above-described embodiment. Within the framework of the invention, it can be constructed from components which function in a technically different manner, using the means which are available to those skilled in the art. For example, instead of the two motors 40 and 40', a central motor can be provided which is connected via transmission means to the two capstans 47, 47'. Such a tape transport is described in U.S. Pat. No. 3,948,464.

We claim:
1. A tape cartridge assembly comprising
a right parallelepipedal cartridge housing having a bottom wall, a top wall and side walls one of which is provided with at least one opening and serves as the front wall,
two hubs which are rotatably mounted inside the housing on common movable support means defining the spacing between said hubs, and which carry rolls of tape windable from one hub to the other,
for use with a transport apparatus of the type
having at least one magnetic head designed to be passed through said opening in the front wall to engage the magnetic tape running inside the cartridge parallel to the front wall, and
having means for driving the two rolls of tape within said cartridge housing;
wherein the support means for the hubs of said tape cartridge assembly are provided with floating suspension means rendering said support means displaceable in the plane of the cartridge housing in all directions.

2. A tape cartridge assembly according to claim 1, wherein said floating suspension means include a resilient element bearing against the top wall and resiliently urging said support means in the direction of the bottom wall.

3. A tape cartridge assembly according to claim 2, wherein said hubs are mounted in said support means by axles having bottom ends urged by said resilient element against a reference surface, whereby said support means are floatingly suspended in the cartridge housing at a predetermined level.

4. A tape cartridge assembly according to claim 2,
wherein said support means are of generally triangular shape,
wherein the hubs are mounted on axles near the two corners of the generally triangular support means, which are adjacent said front wall, and
wherein a spacing element is provided near the third corner of said generally triangular support means, the bottom ends of the two axles and the bottom end of said spacing element being urged by said resilient element against a reference surface, whereby said support means are floatingly suspended at a predetermined level in the cartridge housing.

5. A tape cartridge assembly as claimed in claim 4, wherein there are provided arcuate slots in the bottom wall through which said two axles and said spacing element pass without engaging the walls of the slots.

6. A tape cartridge assembly according to claim 1, wherein the support means comprise a pair of members between which the hubs are rotatably mounted.

7. A tape cartridge assembly according to claim 1, wherein there is provided a frame on the one hand connected to spring means and on the other hand pivotally linked to said support means, said frame also being displaceable in the plane of the cartridge housing in all directions.

8. A tape cartridge assembly according to claim 7, wherein the frame includes a pair of plates between which the support means are mounted.

9. A tape cartridge assembly according to claim 7, wherein said spring means are in the form of two springs interposed between the frame and the rear wall of the cartridge housing.

10. A tape cartridge assembly according to claim 1 or 2, wherein in the vicinity of the front wall there are provided two brake elements which are displaceable parallel to the front wall for engagement by said rolls of magnetic tape, respectively.

11. A tape cartridge assembly according to claim 10, wherein the brake elements for the rolls of magnetic tape are in the form of two pins which are parallel to the hub axles and which are held in a common pair of bars, the bars being guided in recesses in the top and bottom walls, which recesses run parallel to the front wall.

12. A tape cartridge assembly according to claim 11, wherein at least one of the bars is hingedly connected to the support means for the hubs.

13. A tape cartridge assembly according to claim 1, wherein at least one of the outer surfaces of the cartridge housing is provided with guide means which are arranged symmetrically with respect to the transverse center axis and run parallel thereto.

14. A tape cartridge assembly according to claim 1, wherein at least one of the outer surfaces of the cartridge housing is provided with at least one recess for engagement by locking means on the tape transport apparatus.

15. A tape transport apparatus for cooperation with a tape cartridge assembly according to claim 1,
wherein cartridge receiving means of said apparatus pivotably mounts a pair of levers connected to one another by an actuating element, the ends of said levers being designed to be swung down into the cavity accommodating the cartridge, and said levers being provided with projections for locking the cartridge in the cartridge receiving means of said apparatus, resilient means being provided for constantly holding said projections in a state of readiness for engagement of the cartridge, said resilient means at one end acting on the pair of levers and, at the other end, bearing against the cartridge receiving means.

16. A tape transport apparatus for cooperation with a tape cartridge assembly according to claim 3 or 4, wherein the cartridge receiving means of said apparatus are provided with said reference surface, for determining the correct position of the rolls of tape relative to the magnetic head.

17. A tape transport apparatus for cooperation with a tape cartridge assembly according to claim 3 or 4, wherein the edge of the reference surface, which are arranged symmetrically with respect to, and run parallel to, the center line of the cartridge receiving means, serve as guides which cooperate with guides on the cartridge when the latter is inserted into the transport apparatus.

* * * * *